United States Patent
Hashimoto et al.

(10) Patent No.: US 10,027,208 B2
(45) Date of Patent: Jul. 17, 2018

(54) COIL INSTALLATION METHOD AND COIL INSTALLATION JIG

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Hiroyuki Tanaka, Anjo (JP); Hiroki Imada, Anjo (JP); Daichi Kurashige, Nishio (JP); Hisao Miyata, Anjo (JP); Kirika Yoshikawa, Anjo (JP); Tsutomu Ogawa, Nagoya (JP); Takato Harada, Nishio (JP); Norihiko Akao, Nisshin (JP); Tetsuya Sugimoto, Chiryu (JP); Yutaka Seno, Okazaki (JP); Hirotaka Kawaura, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 14/901,901

(22) PCT Filed: Jul. 24, 2014

(86) PCT No.: PCT/JP2014/069589
§ 371 (c)(1),
(2) Date: Dec. 29, 2015

(87) PCT Pub. No.: WO2015/016136
PCT Pub. Date: Feb. 5, 2015

(65) Prior Publication Data
US 2016/0372993 A1     Dec. 22, 2016

(30) Foreign Application Priority Data
Jul. 31, 2013     (JP) .................................. 2013-158555

(51) Int. Cl.
H02K 15/04     (2006.01)
H02K 15/085    (2006.01)
H02K 15/06     (2006.01)

(52) U.S. Cl.
CPC ......... *H02K 15/0435* (2013.01); *H02K 15/04* (2013.01); *H02K 15/066* (2013.01); *H02K 15/085* (2013.01)

(58) Field of Classification Search
CPC .. H05K 15/04; H05K 15/0435; H05K 15/066; H05K 15/085
See application file for complete search history.

(56) References Cited

U.S. PATENT DOCUMENTS 5,090,110 A * 2/1992 Murakoshi ........... H02K 15/085
                                                            29/596
5,763,978 A * 6/1998 Uchida .................. H02K 3/325
                                                            310/214
(Continued)

FOREIGN PATENT DOCUMENTS
CN     1159830 C   *  7/2004
JP     2969484     *  8/1999
(Continued)

*Primary Examiner* — Carl Arbes
(74) *Attorney, Agent, or Firm* — Oliff PLC

(57) ABSTRACT

A coil installation method for installing a coil on a tooth of a stator core to manufacture a stator for a rotary electric machine, the coil installation method including forming the coil such that a rectangular wire is wound into a generally quadrangular shape so as to form three or more winding portions overlapping in a radial direction of the stator core and such that the winding portion positioned on an outer peripheral side in the radial direction has a larger width directed in a circumferential direction of the stator core.

8 Claims, 14 Drawing Sheets

(56) References Cited

U.S. PATENT DOCUMENTS

| | | | | |
|---|---|---|---|---|
| 5,986,377 | A * | 11/1999 | Yamada | H02K 1/148 310/216.013 |
| 6,008,563 | A * | 12/1999 | Baba | H02K 1/146 310/194 |
| 6,121,711 | A * | 9/2000 | Nakahara | H02K 1/14 242/432.3 |
| 6,362,553 | B1 * | 3/2002 | Nakahara | H02K 1/14 310/216.004 |
| 6,455,976 | B1 * | 9/2002 | Nakano | H02K 1/148 310/112 |
| 6,713,927 | B2 * | 3/2004 | Kikuchi | H02K 3/24 310/214 |
| 6,870,292 | B2 * | 3/2005 | Owada | H02K 3/24 310/194 |
| 8,936,211 | B2 * | 1/2015 | Yamaguchi | H01F 41/06 242/432.5 |
| 2010/0066198 | A1 | 3/2010 | Fubuki et al. | |
| 2012/0181891 | A1 * | 7/2012 | Yamada | H02K 3/12 310/201 |

FOREIGN PATENT DOCUMENTS

| | | | |
|---|---|---|---|
| JP | 3024902 B2 * | 3/2000 | |
| JP | 2007-512797 A | 5/2007 | |
| JP | 2008-220093 A | 9/2008 | |
| JP | 2012-257409 A | 12/2012 | |
| JP | 2012-257410 A | 12/2012 | |

* cited by examiner

COIL INSTALLATION METHOD AND COIL INSTALLATION JIG

BACKGROUND

The present disclosure relates to a coil installation method and a coil installation jig that are used to install coils on teeth of a stator core in order to manufacture a stator for a rotary electric machine.

Examples of a method for manufacturing a stator for a rotary electric machine include a method of arranging coils on an integrally shaped stator core and a method of arranging coils on segment cores into which a stator coil is divided and coupling together the segment cores on which the coils are arranged. Furthermore, the coil may be formed by winding a bundle of multiple magnet wires with a small diameter or by winding one rectangular wire. For example, Japanese Patent Application Publication No. 2012-257410 and Japanese Patent Application Publication No. 2012-257409 describe techniques corresponding to manners of installing coils on teeth of a stator core when each of the coils is formed by winding one rectangular wire.

Japanese Patent Application Publication No. 2012-257410 discloses a manufacturing apparatus for a motor stator in which a plurality of trapezoidal coils formed by bending rectangular conductors with a rectangular section are inserted between the plurality of teeth of the stator core. The manufacturing apparatus has clamp pawls that clamp the trapezoidal coil and a coil shape regulating member that regulates the state of the trapezoidal coil to an obliquely deformed state. The trapezoidal coil is inserted between the teeth in a state where a twist of the coil is prevented by the clamp pawls and the coil shape regulating member.

Furthermore, Japanese Patent Application Publication No. 2012-257409 discloses a manufacturing apparatus for a motor stator having a plurality of holding portions that guides a plurality of turn portions of a trapezoidal coil and a moving mechanism that laterally moving the holding portions in a winding direction in which the turn portions are wound. With the movement of each turn portion of the trapezoidal coil controlled by the corresponding holding portion to prevent a twist of the coil, the coil is formed into an obliquely deformed shape, and the deformed coil is inserted between the teeth.

SUMMARY

However, when the coils are sequentially installed on the plurality of teeth of the stator core, each of the coils is likely to interfere with the stator core, another coil, or the like. Thus, to allow the coil to be smoothly installed, a method and a jig for installing the coil need to be further improved.

In Japanese Patent Application Publication No. 2012-257410, the clamp pawls and the coil shape regulating member regulate a change in the shape of the trapezoidal coil in a radial direction and a change in the shape of the trapezoidal coil in an axial direction (the axial direction of the stator core). On the other hand, Japanese Patent Application Publication No. 2012-257409, the plurality of holding portions restrains the movement of all the turn portions of the trapezoidal coil. Thus, the movement of the trapezoidal coil is restrained more than necessary, hindering smooth installation of the coil.

The present disclosure has been developed in view of such circumstances. The present disclosure according to an exemplary aspect attempts to provide a coil installation method and a coil installation jig that allow coils to be flexibly and smoothly installed on teeth of a stator core.

According to an exemplary aspect of the present disclosure, a coil installation method for installing a coil on a tooth of a stator core to manufacture a stator for a rotary electric machine includes the steps of forming the coil such that a rectangular wire is wound into a generally quadrangular shape so as to form three or more winding portions overlapping in a radial direction of the stator core and such that the winding portion positioned on an outer peripheral side in the radial direction has a larger width directed in a circumferential direction of the stator core, and holding the plurality of winding portions in a sandwiching manner in the radial direction, an innermost peripheral winding portion of the plurality of winding portions disposed at an innermost peripheral side in the radial direction and an outermost peripheral winding portion of the plurality of winding portions disposed at an outermost peripheral side in the radial direction are restrained in the circumferential direction, and the innermost peripheral winding portion and the outermost peripheral winding portion are moved relative to each other in opposite directions in the circumferential direction to deform the coil when the coil is installed on the tooth.

According to another aspect of the present disclosure, a coil installation jig for installing a coil on a tooth of a stator core to manufacture a stator for a rotary electric machine, wherein the coil is formed such that a rectangular wire is wound into a generally quadrangular shape so as to form three or more winding portions overlapping in a radial direction of the stator core and such that the winding portion positioned on an outer peripheral side in the radial direction has a larger width directed in a circumferential direction of the stator core, includes: an inner-peripheral-side support that supports an innermost peripheral winding portion of the plurality of winding portions positioned at an innermost peripheral side in the radial direction; an outer-peripheral-side support that supports an outermost peripheral winding portion of the plurality of winding portions positioned at an outermost peripheral side in the radial direction, and a coil deformer that moves the inner-peripheral-side support and the outer-peripheral-side support relative to each other in opposite directions in the circumferential direction, the inner-peripheral-side support and the outer-peripheral-side support are configured to hold the plurality of winding portions in the radial direction in a sandwiching manner and restrain the innermost peripheral winding portion and the outermost peripheral winding portion in the circumferential direction, and the coil deformer is configured to move the inner-peripheral-side support and the outer-peripheral-side support relative to each other to deform the coil supported by the inner-peripheral-side support and the outer-peripheral-side support when the coil is installed on the tooth.

In the above-described coil installation method, a manner of supporting the coil when the coil is installed on the tooth of the stator core is improved.

Specifically, when the coil is installed on the tooth, the plurality of winding portions is held in a sandwiching manner in the radial direction, and the innermost peripheral winding portion of the plurality of winding portions disposed at the innermost peripheral side in the radial direction and the outermost peripheral winding portion of the plurality of winding portions disposed at the outermost peripheral side in the radial direction are restrained in the circumferential direction. This manner of supporting the coil allows formation of a state where an intermediate winding portion corresponding to a portion of the plurality of winding portions except the innermost peripheral winding portion and the outermost peripheral winding portion can move freely in the circumferential direction.

Furthermore, the innermost peripheral winding portion and the outermost peripheral winding portion are moved relative to each other in opposite directions in the circumferential direction to deform the coil. When the coil is installed on the tooth, even if the intermediate winding portion of the coil interferers slightly with an insulator installed on the tooth, an adjacent coil previously installed on a corresponding tooth, the stator core, or the like, the intermediate winding portion can be flexibly displaced.

Additionally, when the coil is installed, a force holding the plurality of winding portions in a sandwiching manner in the radial direction can be weakened. This allows formation of a state where the intermediate winding portion is more easily displaced. At this time, since the innermost peripheral winding portion and the outermost peripheral winding portion are restrained in the circumferential direction, the whole coil can be prevented from being unnecessarily displaced.

Therefore, the above-described coil installation method allows the coil to be more flexibly and smoothly installed on the tooth of the stator core.

The above-described coil installation jig uses the inner-peripheral-side support, the outer-peripheral-side support, and the coil deformer to install the coil on the tooth of the stator core as is the case with the coil installation method. In this case, the whole coil can be prevented from being unnecessarily displaced to allow the intermediate winding portion of the coil to be flexibly displaced.

Therefore, the above-described coil installation jig allows the coil to be more flexibly and smoothly installed on the tooth of the stator core.

DETAILED DESCRIPTION OF EMBODIMENTS

Preferred embodiments of the above-described coil installation method and coil installation jig will be described below.

In the above-described coil installation method, four corners of the innermost peripheral winding portion of the generally quadrangular shape may be restrained in the circumferential direction of the stator core and the axial direction of the stator core, and at least two corners of the outermost peripheral winding portion of the generally quadrangular shape may be restrained in the circumferential direction and the axial direction. In the coil installation jig, the inner-peripheral-side support portion is configured to restrain the four corners of the innermost peripheral winding portion of the generally quadrangular shape in the circumferential direction of the stator core and the axial direction of the stator core, and the outer-peripheral-side support portion may be configured to restrain at least two corners of the outermost peripheral winding portion of the generally quadrangular shape in the circumferential direction and the axial direction.

In these cases, the restraint of the outermost peripheral winding portion disposed on an outer side (radially outer peripheral side) of the tooth is set looser than the restraint of the innermost peripheral winding portion disposed on an inner side (radially inner peripheral side) of the tooth. Thus, the coil can be more flexibly and smoothly installed on the tooth.

In the above-described coil installation method, the coil that has not been installed on the tooth yet may be deformed and then the resultant coil is recovered from the deformation during or after installation on the tooth. In the coil installation jig, the coil deforming mechanism may be configured to move the inner-peripheral-side jig portion and the outer-peripheral-side jig portion relative to each other so that the coil that has not been installed on the tooth yet is deformed and then the resultant coil is recovered from the deformation while or after being installed on the tooth.

In these cases, the coil can be more flexibly and smoothly installed on the tooth.

Embodiments of the coil installation method and the coil installation jig will be described below with reference to the drawings.

Figure 8:
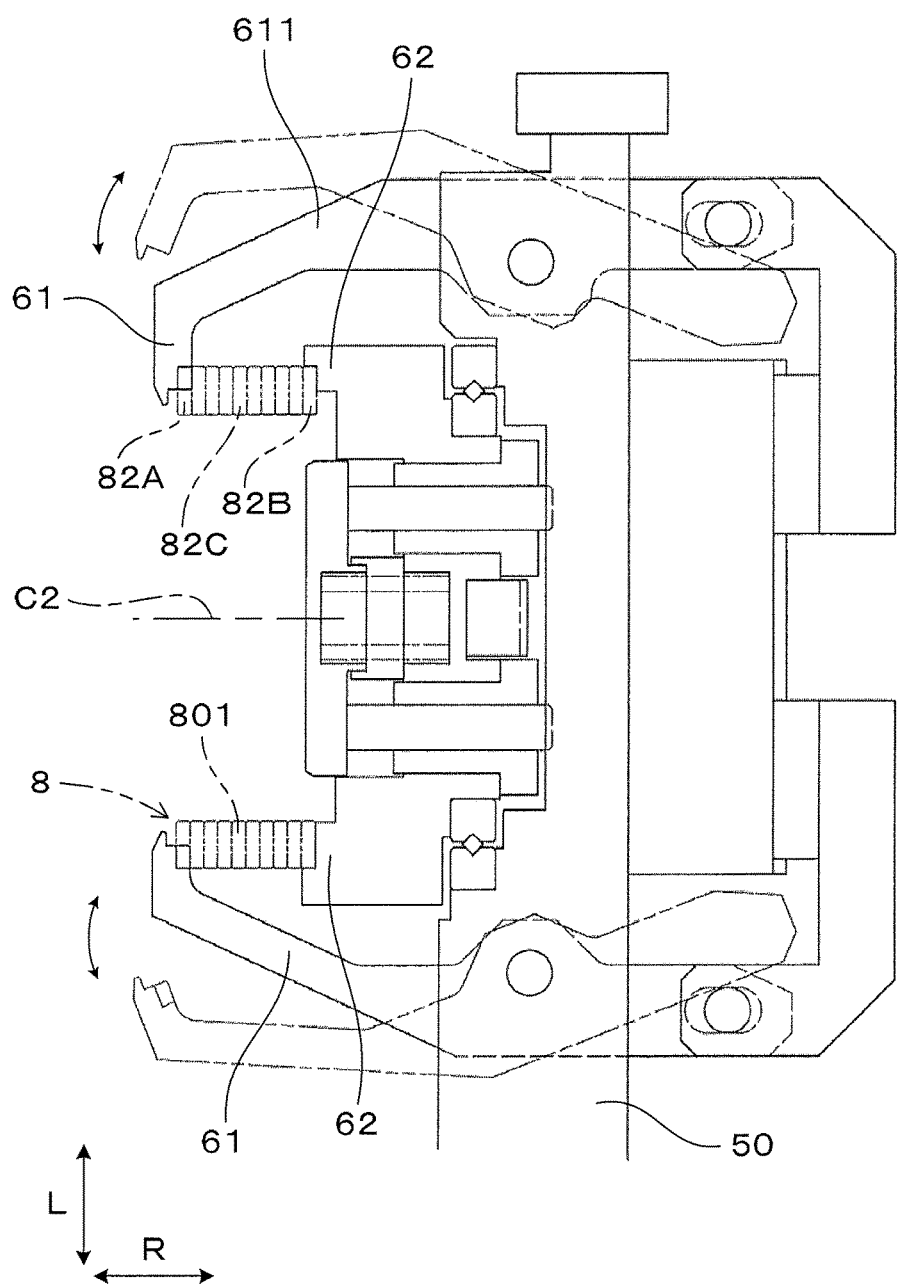
FIG. 8 is a diagram illustrating a periphery of the coil support portion according to the embodiment as viewed from the side.
Figure 9:
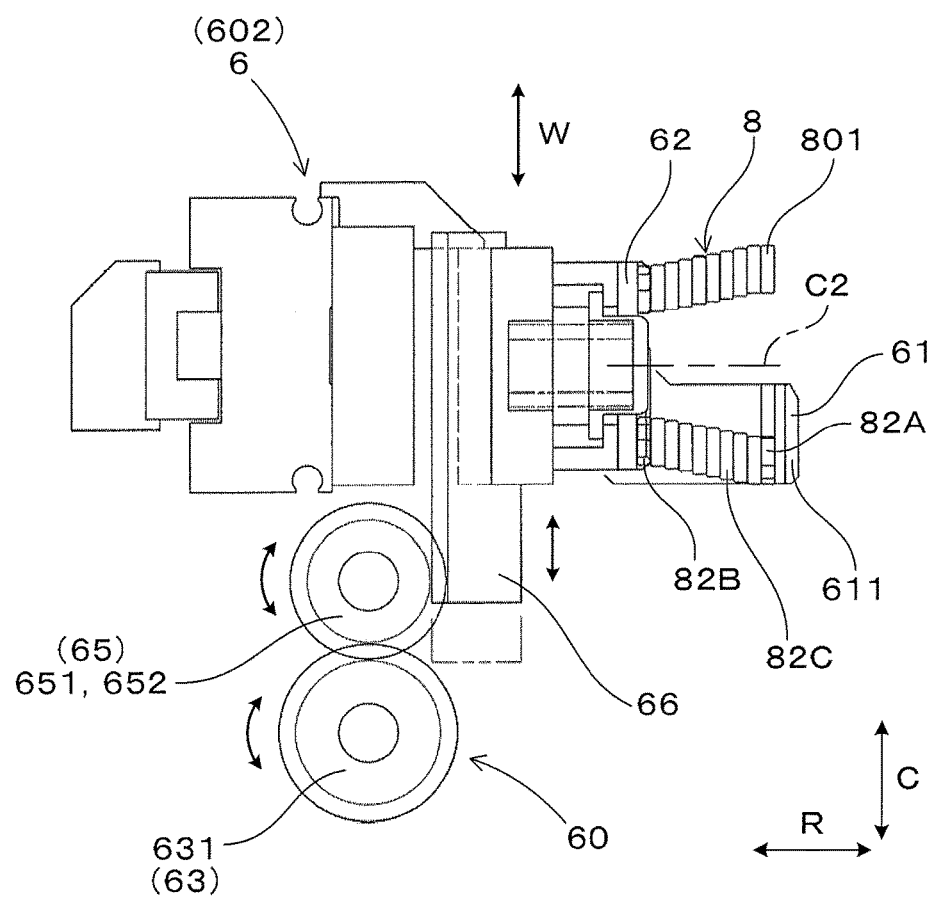
FIG. 9 is a diagram illustrating a periphery of the coil support portion with the coil not deformed according to the embodiment as viewed from above.

The coil installation method in the present example is a method for installing coils 8 on teeth 71 of a stator core 7 to manufacture a stator for a rotary electric machine. As depicted in FIG. 8, FIG. 9, each of the coils 8 is formed such that a rectangular wire 801 is wound into a generally quadrangular shape so as to form three or more winding portions 82A, 82B, 82C overlapping in a radial direction R of the stator core 7 and such that the winding portion 82A, 82B, 82C positioned on an outer peripheral side in the radial direction R has a larger width directed in a circumferential direction C of the stator core 7. The number of the winding portions 82A, 82B, 82C in the radial direction R may be, for example, three or more and ten or less.

When the coil 8 is installed on the tooth 71, the plurality of winding portions 82A, 82B, 82C is held in a sandwiching manner in the radial direction R as depicted in FIG. 8, and the innermost peripheral winding portion 82B of the plurality of winding portions 82A, 82B, 82C disposed at the innermost peripheral side in the radial direction R and the outermost peripheral winding portion 82A of the plurality of winding portions 82A, 82B, 82C disposed at the outermost peripheral side in the radial direction R are restrained in the circumferential direction C. The innermost peripheral winding portion 82B and the outermost peripheral winding portion 82A are moved relative to each other in opposite directions in the circumferential direction C to deform the coil 8 into a rhombus when the coil 8 is installed on the tooth 71.

The coil installation method and the coil installation jig 1 in the present example will be described below in detail with reference to FIGS. 1 to 14.

Figure 10:
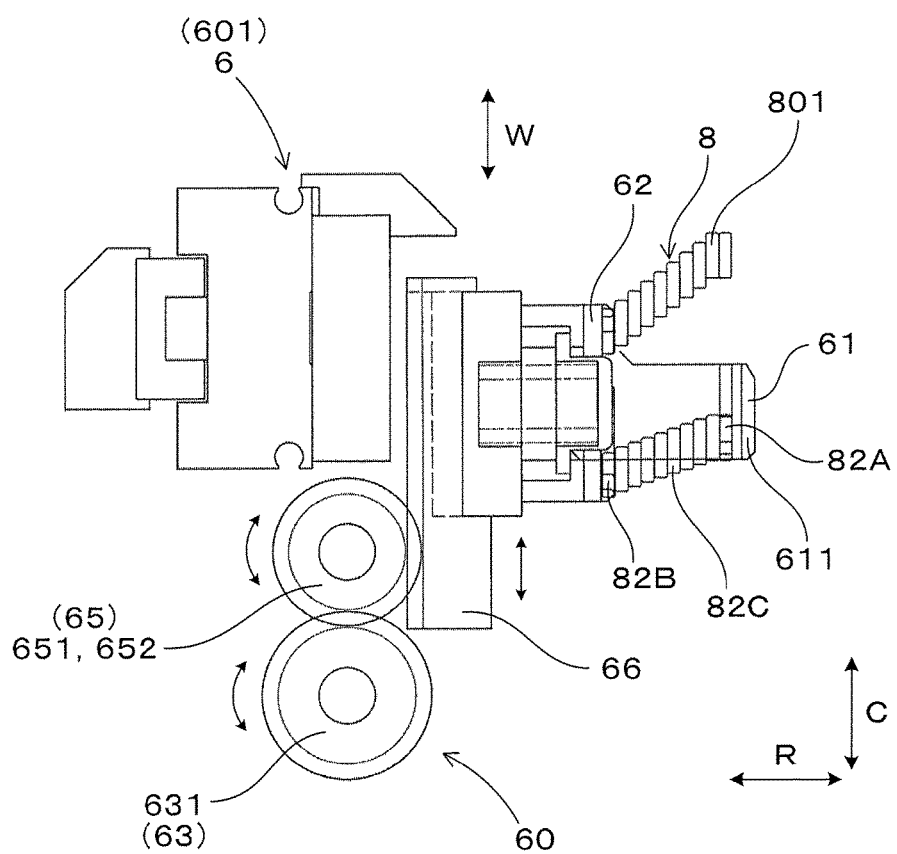
FIG. 10 is a diagram illustrating a periphery of the coil support portion with the coil deformed according to the embodiment as viewed from above.
Figure 11:
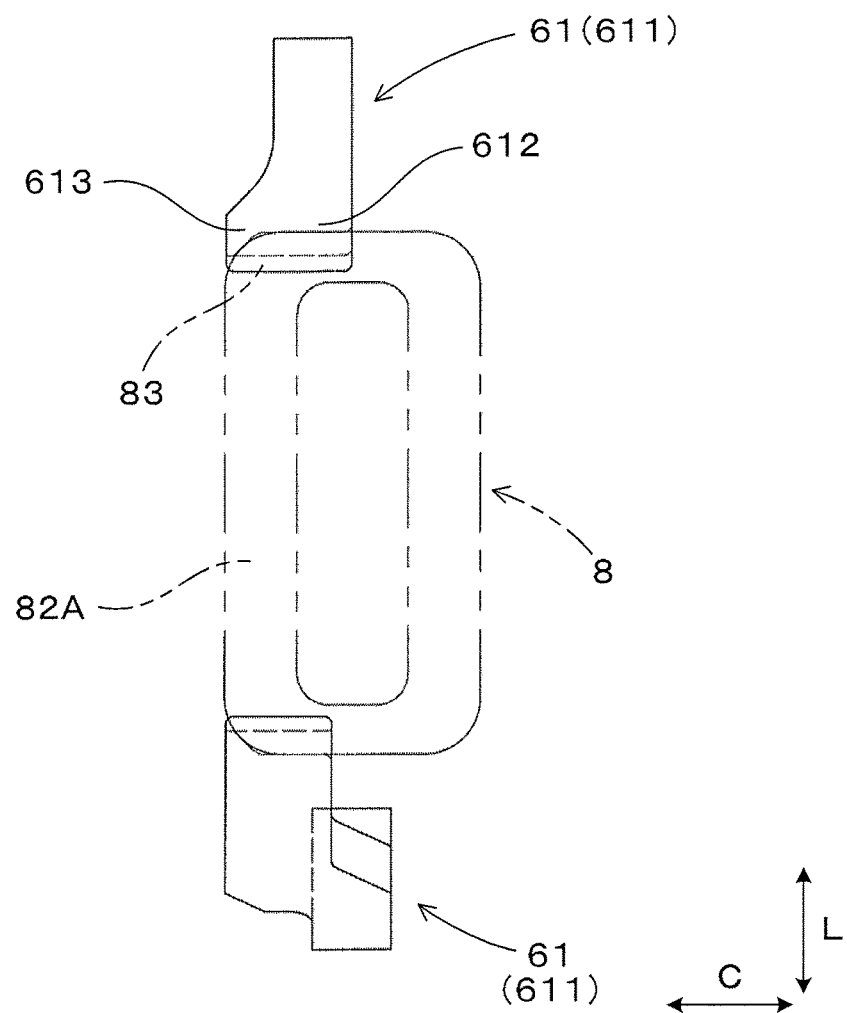
FIG. 11 is a diagram illustrating a periphery of an outer-peripheral-side support portion according to the embodiment as viewed from the front.
Figure 12:
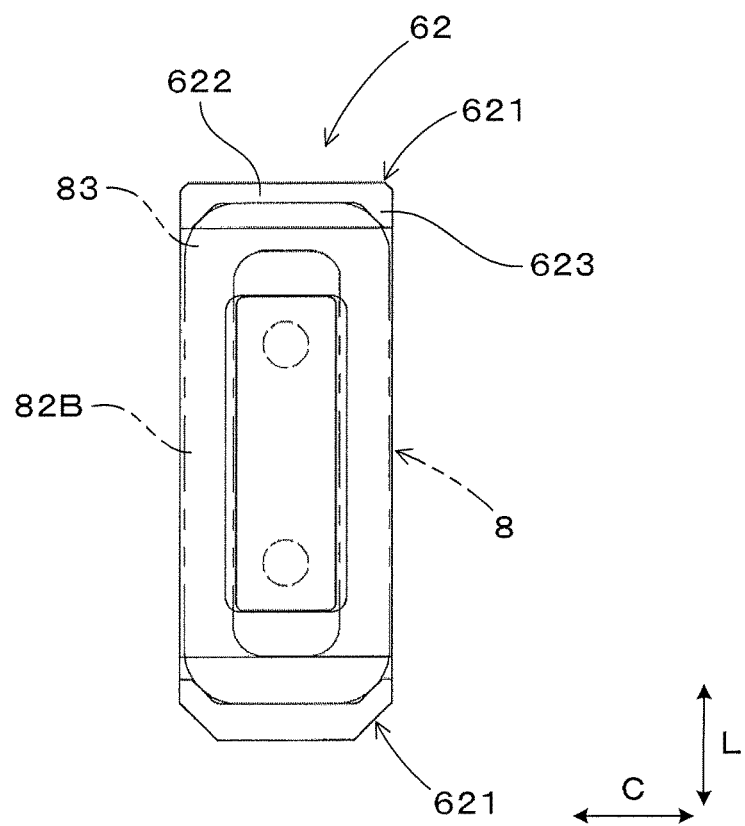
FIG. 12 is a diagram illustrating a periphery of an inner-peripheral-side support portion according to the embodiment as viewed from the front.

In the present example, when the coil 8 is installed on the tooth 71, the coil installation jig 1 is used which includes an inner-peripheral-side support portion 62, an outer-peripheral-side support portion 61, and a coil deforming mechanism 60. As depicted in FIG. 12, the inner-peripheral-side support portion 62 is configured to support the innermost peripheral winding portion 82B of the plurality of winding portions 82A, 82B, 82C located at the innermost peripheral side in the radial direction R. As depicted in FIG. 11, the outer-peripheral-side support portion 61 is configured to support the outermost peripheral winding portion 82A of the plurality of winding portions 82A, 82B, 82C located at the outermost peripheral side in the radial direction R. As depicted in FIG. 9, FIG. 10, the coil deforming mechanism 60 is configured to move the inner-peripheral-side support portion 62 and the outer-peripheral-side support portion 61 relative to each other in the opposite directions in the circumferential direction C.

Furthermore, as depicted in FIG. 8, the inner-peripheral-side support portion 62 and the outer-peripheral-side support portion 61 are configured to sandwich the plurality of winding portions 82A, 82B, 82C between the support portions 62 and 61 in the radial direction R and to restrain the innermost peripheral winding portion 82B and the outermost peripheral winding portion 82A in the circumferential direction C. As depicted in FIG. 12, the inner-peripheral-side support portion 62 is configured to restrain four corners 83 of the generally quadrangular shape of the innermost peripheral winding portion 82B in the circumferential direction C of the stator core 7 and the axial direction L of the stator core 7. As depicted in FIG. 11, the outer-peripheral-side support portion 61 is configured to restrain two of four corners 83 of the generally quadrangular shape of the outermost peripheral winding portion 82A in the circumferential direction C of the stator core 7 and the axial direction L of the stator core 7. The two corners 83 are positioned on one side in the circumferential direction C. As depicted in FIG. 9, FIG. 10, the coil deforming mechanism 60 is configured to move the inner-peripheral-side support portion 62 and the outer-peripheral-side support portion 61 relative to each other to deform the coil 8 supported by the inner-peripheral-side support portion 62 and the outer-peripheral-side support portion 61 into a rhombus when the coil 8 is installed on the tooth 71.

As depicted in FIG. 8, the outer-peripheral-side support portion 61 is configured to support coil portions located on an upper and a lower sides of the outermost peripheral winding portion 82A of the coil 8, and the inner-peripheral-side support portion 62 is configured to support coil portions located on an upper and a lower sides of the innermost peripheral winding portion 82B of the coil 8.

The outer-peripheral-side support portion 61 is configured to support the upper and lower coil portions of the outermost peripheral winding portion 82A of the coil 8 using clampers 611 provided over and under the outermost peripheral winding portion 82A so as to sandwich the coil 8 between the outer-peripheral-side support portion 61 and the inner-peripheral-side support portion 62. The inner-peripheral-side support portion 62 is attached to a W direction slider 66 described below. The outer-peripheral-side support portion 61 and the inner-peripheral-side support portion 62 support the coil 8 in a sandwiching manner in a winding axial direction C2.

As depicted in FIG. 12, the inner-peripheral-side support portion 62 is divided into upper and lower support portions 621. The upper and lower support portions 621 each have a guide portion 622 that guides the upper coil portion (or the lower coil portion) of the innermost peripheral winding portion 82B in the axial direction L and a pair of guide portions 623 formed on opposite sides of the guide portion 622 in the circumferential direction C to guide coil portions of the innermost peripheral winding portion 82B positioned in the circumferential direction C.

As depicted in FIG. 11, the upper and lower clampers 611 included in the outer-peripheral-side support portion 61 each have a guide portion 612 that guides the upper coil portion (or the lower coil portion) of the outermost peripheral winding portion 82A in the axial direction L and a guide portion 613 formed on one side of the guide portion 612 in the circumferential direction C to guide a coil portion of the outermost peripheral winding portion 82A positioned in the circumferential direction C.

The coil deforming mechanism 60 moves the inner-peripheral-side support portion 62 and the outer-peripheral-side support portion 61 relative to each other to deform the coil 8 that has not been installed on the tooth 71 yet into a rhombus and gradually recovers the coil 8 from the deformation to an original natural state while the coil 8 is being installed on the tooth 71. The inner-peripheral-side support portion 62, the outer-peripheral-side support portion 61, and the coil deforming mechanism 60 are included in a mechanism for the portions supporting the coil 8, and are configured as a coil support portion 6 described below. A mechanism that moves with respect to the stator core 7 to install the coil 8 on the tooth 71 generally includes a support frame 11, a base portion 2, an X direction slide portion 3, a Y direction slide portion 4, and a θ direction rotating portion 5.

Figure 1:
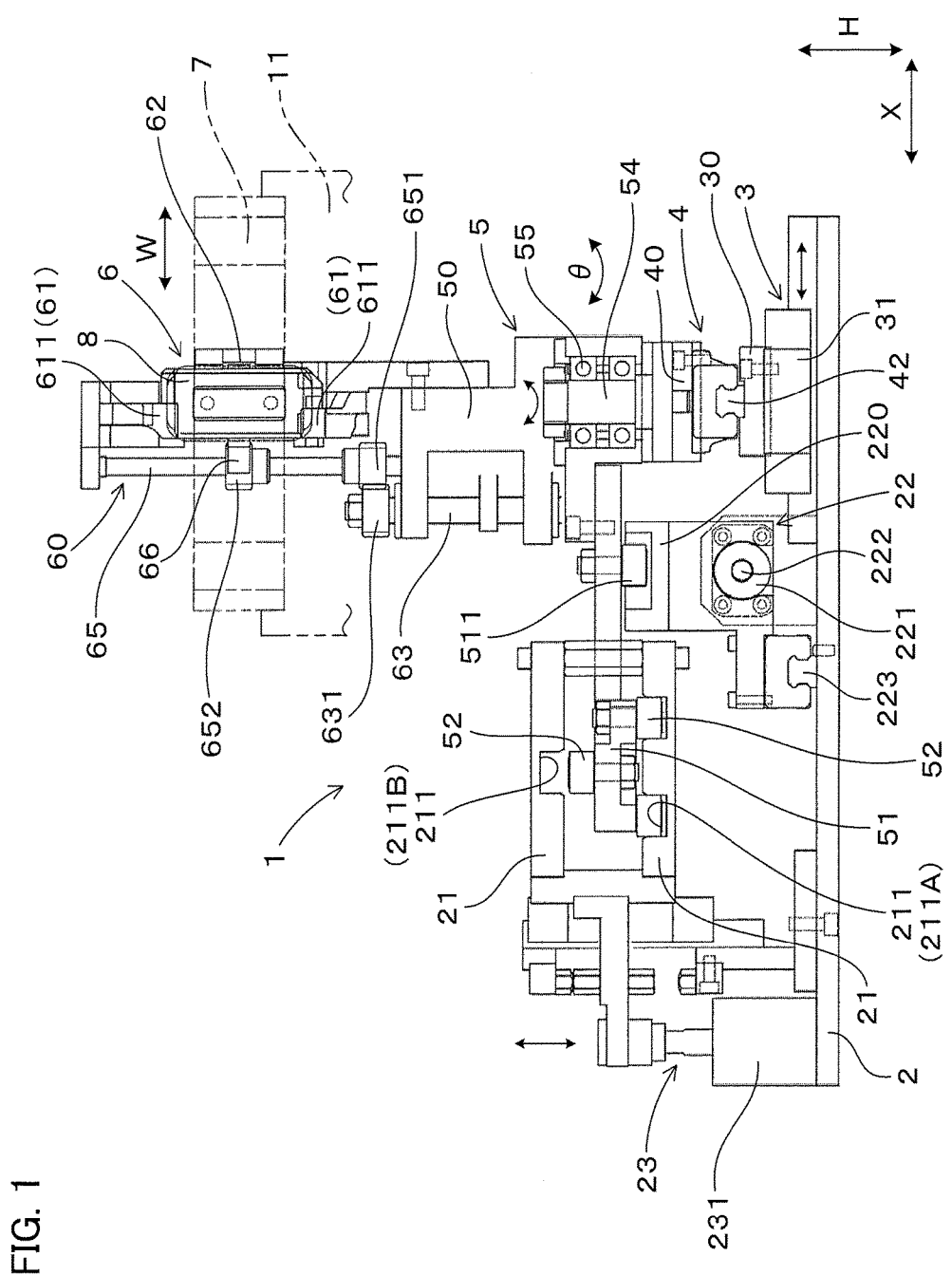
FIG. 1 is a diagram illustrating a coil installation jig according to an embodiment as viewed from the front.
Figure 2:
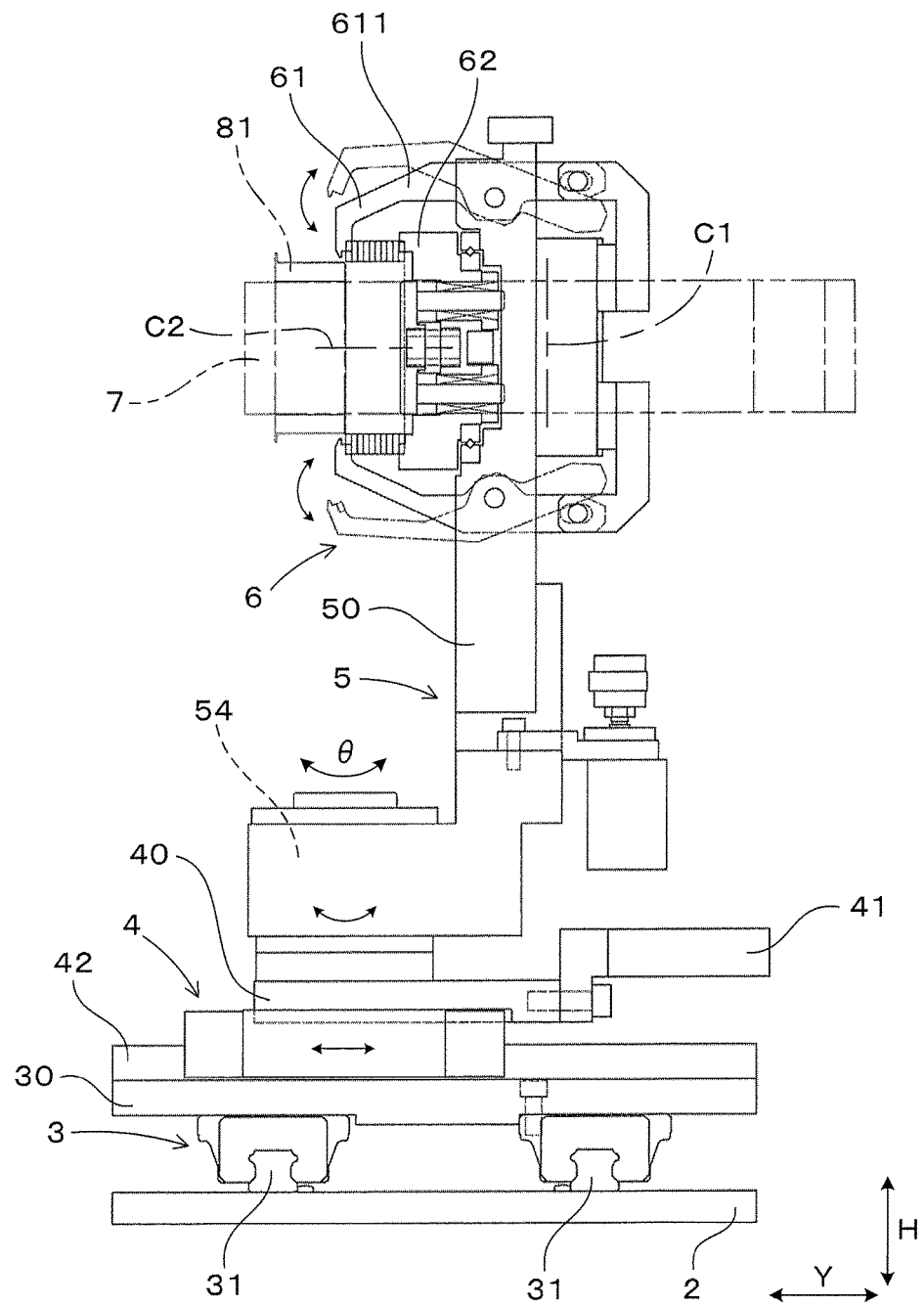
FIG. 2 is a diagram illustrating the coil installation jig according to the embodiment as viewed from the side.

As depicted in FIG. 1, FIG. 2, the coil installation jig 1 includes the support frame 11, the coil support portion 6, the base portion 2, the X direction slide portion 3, the Y direction slide portion 4, and the θ direction rotating portion 5. The support frame 11 is configured to support the stator core 7 such that a central axial direction C1 of the stator core 7 extends along an up-down direction H. The coil support portion 6 is configured to support the coil 8 such that the winding axial direction C2 of the coil is directed along a movement plane orthogonal to the up-down direction H. The base portion 2 has a movement guiding lane 211 that determines a movement path and a rotation amount of the coil support portion 6 at the time of installation of the coil 8 on the tooth 71.

Figure 5:
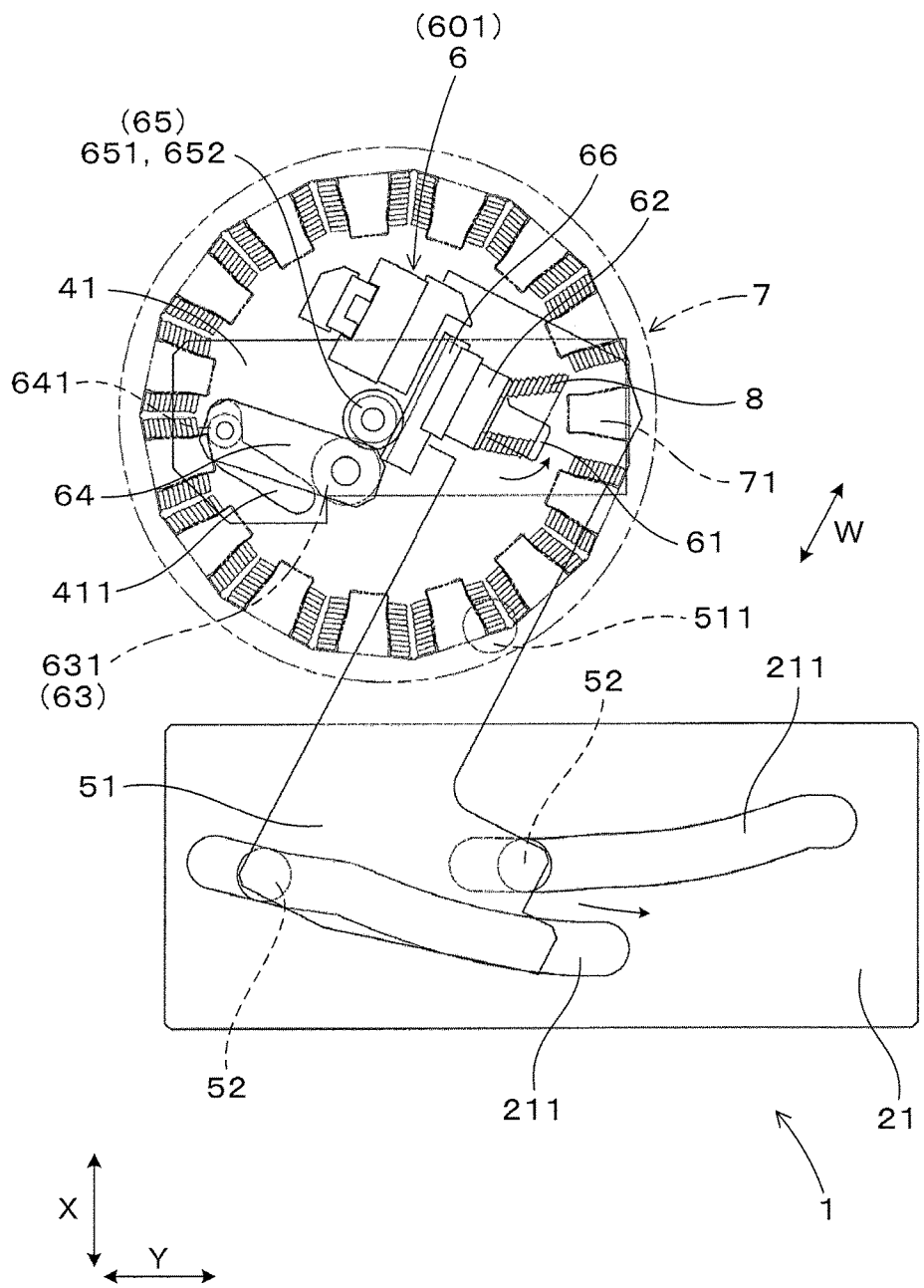
FIG. 5 is a diagram illustrating the coil installation jig with a coil support portion located at an original position where the coil is deformed according to the embodiment as viewed from above.
Figure 6:
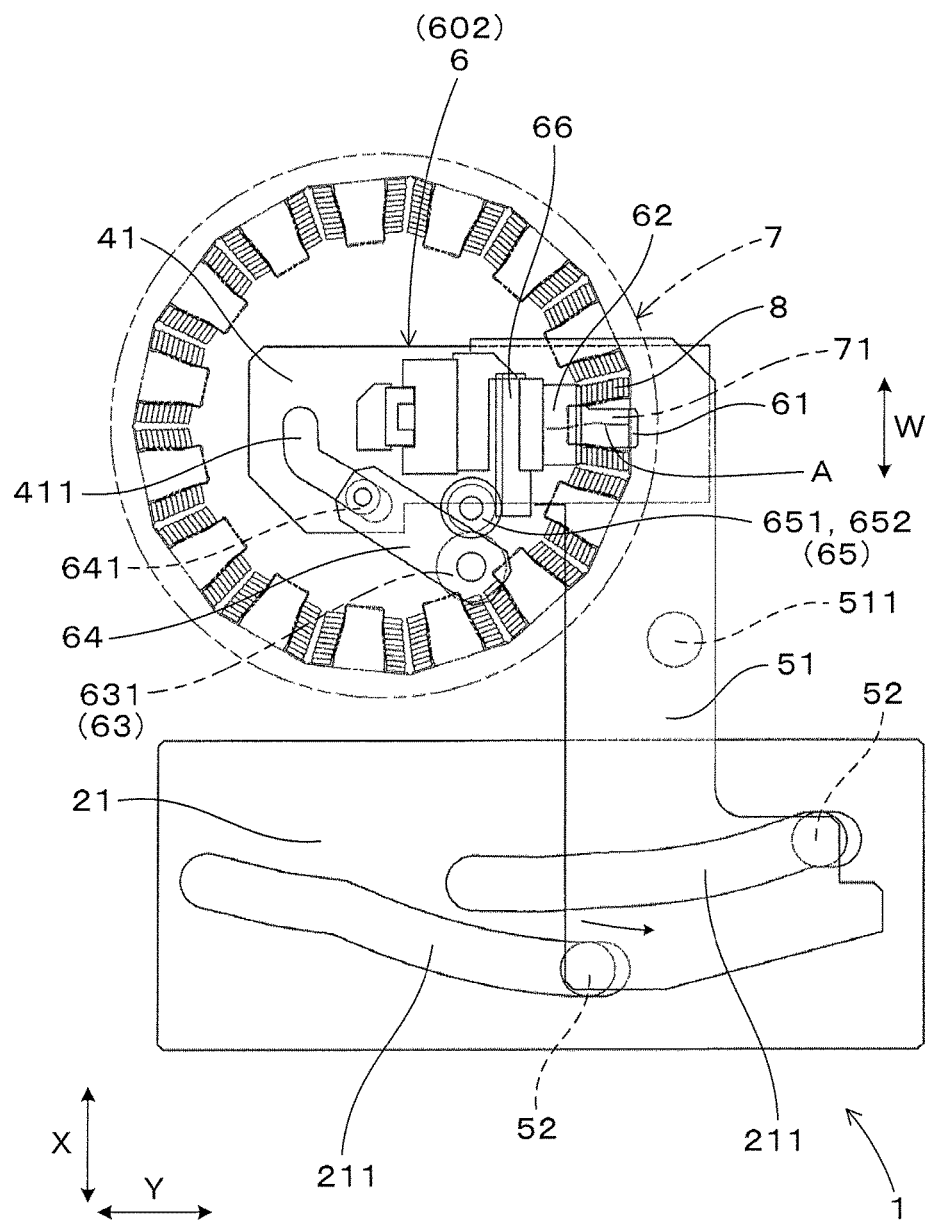
FIG. 6 is a diagram illustrating the coil installation jig with the coil support portion located at an installation position where the coil is not deformed according to the embodiment as viewed from above.

The X direction slide portion 3 is disposed on the base portion 2 and configured to slide the coil support portion 6 in an X direction (X) in the movement plane. The Y direction slide portion 4 is disposed on the X direction slide portion 3 and configured to slide the coil support portion 6 in a Y direction (Y) in the movement plane. As depicted in FIG. 5, FIG. 6, the Y direction slide portion 4 has a deformation guiding lane 411 that determines the amount by which the coil 8 is deformed when the coil 8 supported by the coil support portion 6 is installed on the tooth 71. The θ direction rotating portion 5 is disposed on the Y direction slide portion 4 and configured to rotate the coil support portion 6 in a θ rotating direction (θ) in the movement plane. The θ direction rotating portion 5 has movement guiding members 52 guided and moved along the movement guiding lane 211.

Figure 3:
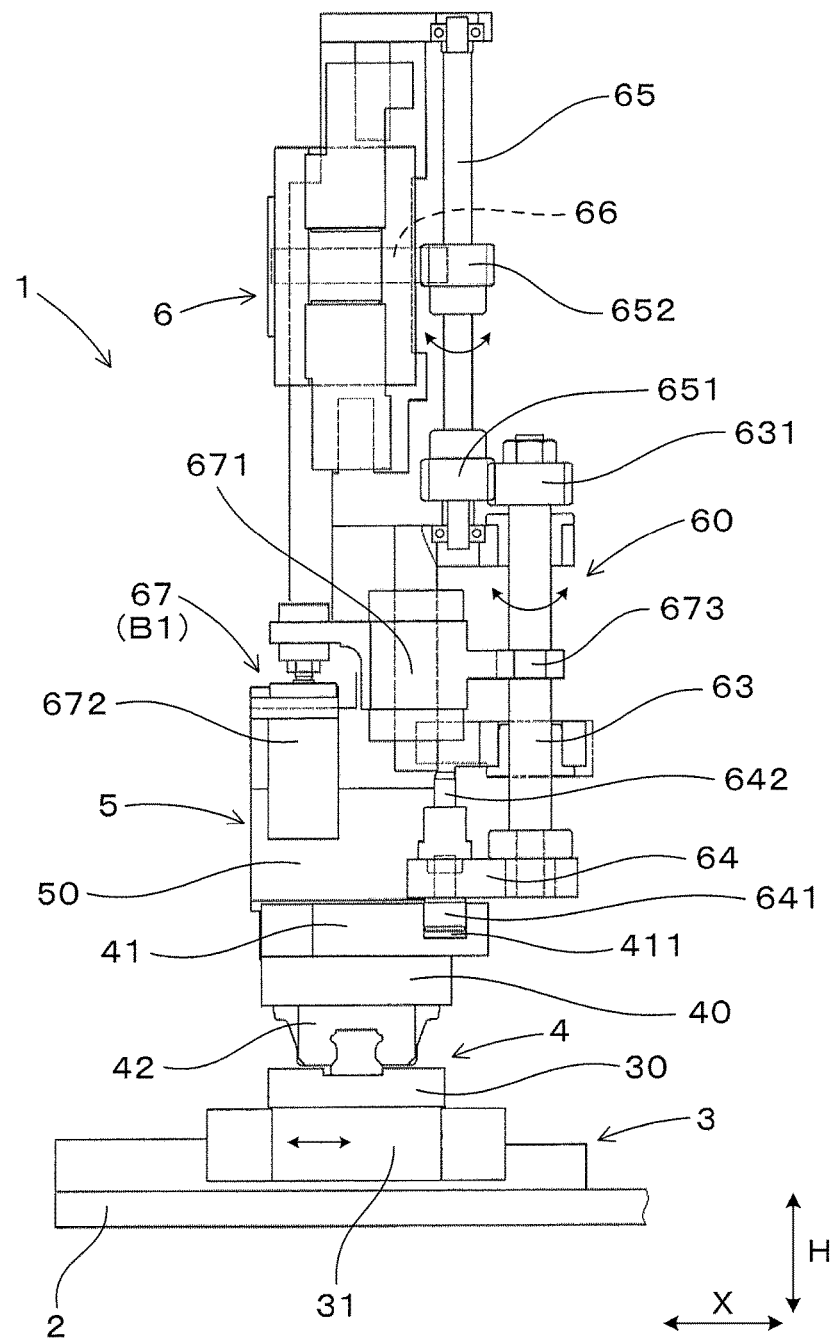
FIG. 3 is a diagram illustrating a coil installation jig with a deformation switching portion located at a coil deformed position according to the embodiment as viewed from behind.

As depicted in FIGS. 1 to 3, the coil support portion 6 has the outer-peripheral-side support portion 61, a rotating shaft portion 63, a deformation link 64, and the inner-peripheral-side support portion 62. The outer-peripheral-side support portion 61 is disposed on the θ direction rotating portion 5 and configured to support one end side of the coil 8 in the winding axial direction C2 corresponding to an outer peripheral side of the coil 8 in the radial direction R. The rotating shaft portion 63 is disposed on the θ direction rotating portion 5 so as to be rotatable. The deformation link 64 is fixed to the rotating shaft portion 63 and has a deformation guiding member 641 guided and moved along the deformation guiding lane 411. The inner-peripheral-side support portion 62 is disposed on the θ direction rotating portion 5. The inner-peripheral-side support portion 62 supports the other end side of the coil 8 in the winding axial direction C2 corresponding to an inner peripheral side of the coil 8 in the radial direction R, while being slidable in a W direction (W) in the movement plane under rotation of the rotating shaft portion 63.

Figure 7:
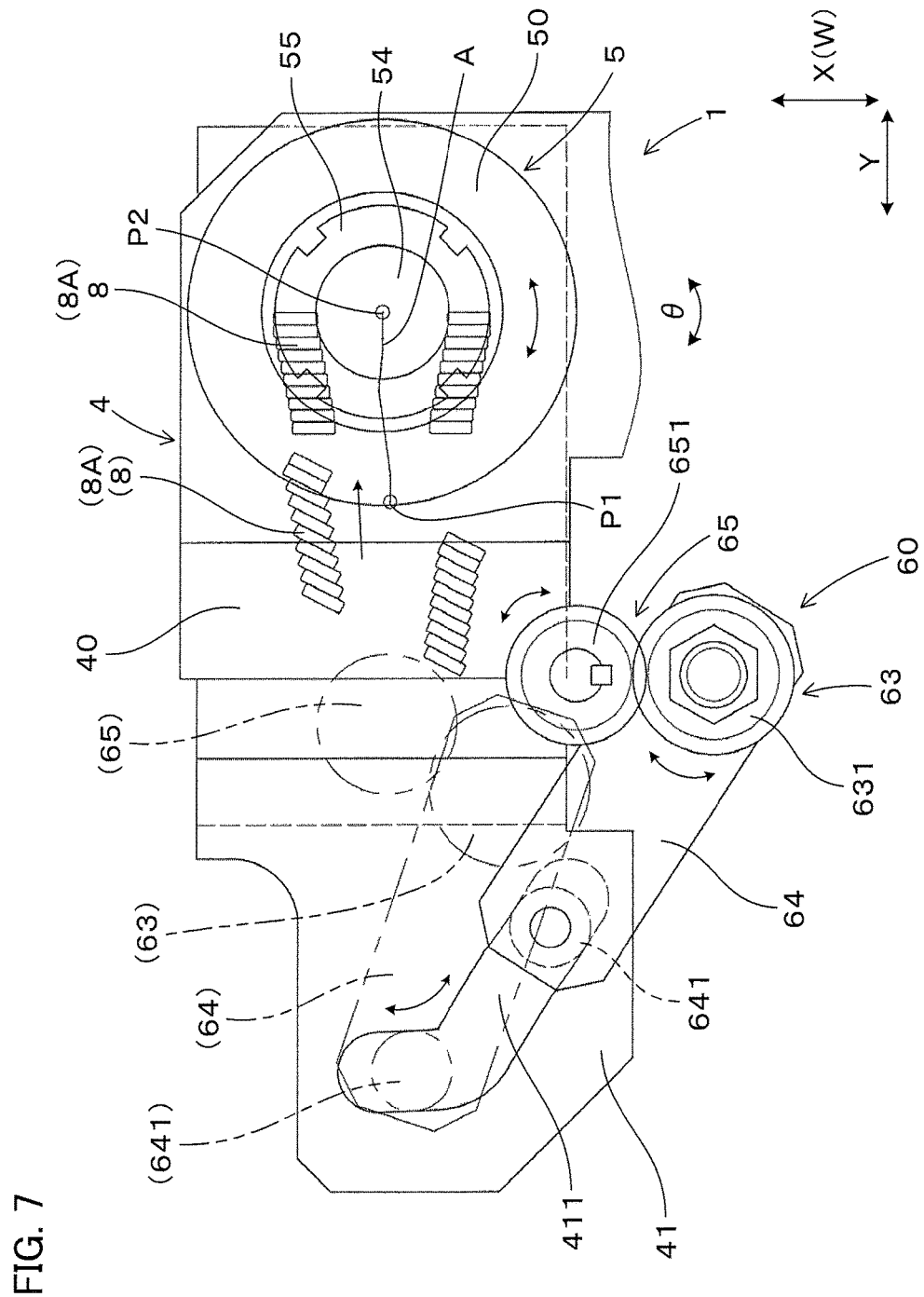
FIG. 7 is a diagram illustrating peripheries of a θ direction rotating portion, a deformation guiding lane, a deformation link, a rotating shaft portion, and the like according to the embodiment as viewed from above.

As depicted in FIGS. 5 to 7, the coil installation jig 1 is configured such that, when the coil support portion 6 is moved and rotated in the movement plane by the X direction slide portion 3, the Y direction slide portion 4, and the θ direction rotating portion 5, the movement guiding members 52 each move along the movement guiding lane 211 to regulate the moving distance and rotating distance of the coil support portion 6. Furthermore, the coil installation jig 1 is configured such that, when the θ direction rotating portion 5 rotates with respect to the Y direction slide portion 4 by a predetermined distance, the deformation guiding member 641 moves along the deformation guiding lane 411 and the deformation link 64 and the rotating shaft portion 63 rotate by predetermined distances, and thus the inner-peripheral-side support portion 62 slides in the W direction (W) in the movement plane to change a deformed state of the coil 8 supported by the inner-peripheral-side support portion 62 and the outer-peripheral-side support portion 61.

Figure 13:
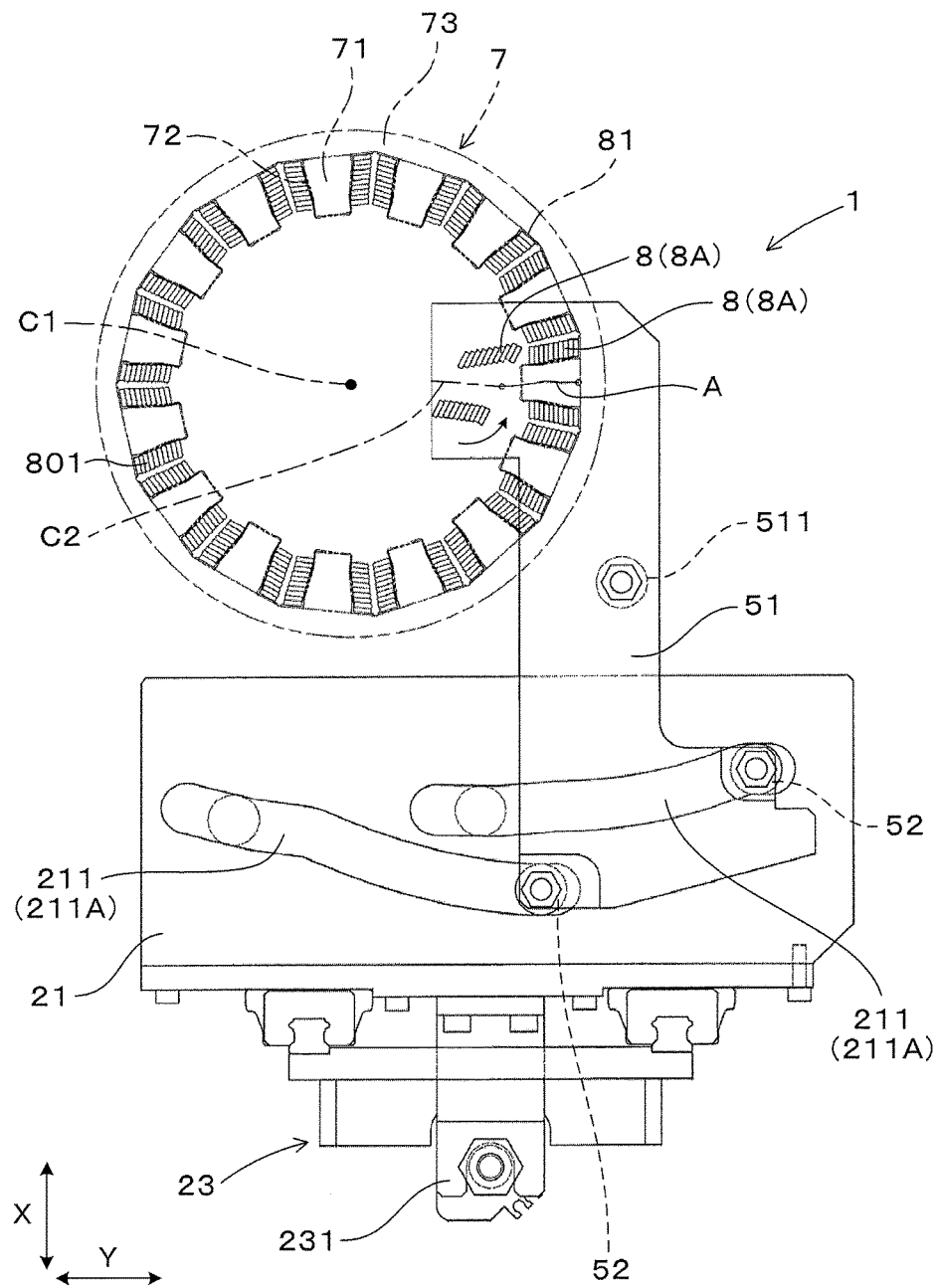
FIG. 13 is a diagram illustrating that a final coil is installed on a tooth of a stator core according to the embodiment as viewed from above.

As depicted in FIG. 13, the stator core 7 is provided with the teeth 71 arranged on an inner peripheral side of a ring-shaped yoke portion 73 at regular intervals in the circumferential direction C. Slots 72 are each formed between the teeth 71 such that the coils 8 to be installed on the teeth 71 are each inserted and arranged between the teeth 71. The coil installation jig 1 is used to sequentially install the coils 8 on the plurality of teeth 71 of the stator core 7 such that the installation proceeds all around the stator core 7 in the circumferential direction C that is either clockwise or counterclockwise.

In FIGS. 1 to 14, the Y direction (Y) in the movement plane is set to be parallel to the radial direction R of the stator core 7, that is, a direction in which the teeth 71 are formed, and the X direction (X) in the movement plane is set to be orthogonal to the Y direction (Y). The W direction in the movement plane is set to be orthogonal to a direction in which the outer-peripheral-side support portion 61 and the inner-peripheral-side support portion 62 are aligned. The up-down direction H extends in the vertical direction.

As depicted in FIG. 1, the support frame 11 is configured to support the stator core 7. On the support frame 11, a rotary indexing apparatus (not depicted in the drawings) is disposed which enables relative rotation positions of the stator core 7 and the coil installation jig 1 to be changed in order to sequentially place the coil 8 supported by the coil support portion 6 opposite to the corresponding tooth 71 of the stator core 7.

On the base portion 2, a driving source 22 is disposed which drives the Y direction slide portion 4. The driving source 22 is configured using a motor 221 and a ball screw 222 that converts a turning force exerted by the motor 221 into a thrust. The base portion 2 is provided with a linear guide 223 disposed parallel to a slide direction of the Y direction slide portion 4. A driving base 220 driven by the driving source 22 can slide along the linear guide 223 and is engaged with the θ direction rotating portion 5.

A moving cam base 51 of the θ direction rotating portion 5 described below is provided with a driving roller 511 that is in contact with the driving base 220. A driving force exerted by the driving source 22 is transmitted from the driving base 220 to the θ direction rotating portion 5 and the like via the driving roller 511. When the driving source 22 is used to drive the θ direction rotating portion 5 in the slide direction of the Y direction slide portion 4, the coil support portion 6 is moved in rotation by the X direction slide portion 3, the Y direction slide portion 4, and the θ direction rotating portion 5.

The driving base 220 driven by the driving source 22 may be engaged with the Y direction slide portion 4.

When the Y direction slide portion 4 is placed at a retracted position, the coil support portion 6 is at an original position 601 where the coil support portion 6 is allowed to support the coil 8. At the original position 601, the coil 8 is deformed into a rhombus by the coil support portion 6. Furthermore, when the Y direction slide portion 4 is slid to an advanced position, the coil support portion 6 moves to an installation position 602 where the coil 8 is installed on the tooth 71 of the stator core 7. At the installation position 602, the coil 8 is in a natural state where the coil 8 is trapezoidal, which is the shape of the coil 8 before being deformed by the coil support portion 6.

As depicted in FIG. 5, FIG. 6, the movement guiding lanes 211 of the base portion 2 are formed of movement guiding grooves 211 formed in the movement guiding plate 21 provided on the base portion 2. Two movement guiding grooves 211 are formed in the movement guiding plate 21 in order to allow the θ direction rotating portion 5 and the coil support portion 6 to move and rotate. The moving cam plate 51 provided with movement guiding rollers 52 serving as the movement guiding members 52 are attached to the θ direction rotating portion 5. The two movement guiding rollers 52 on the moving cam plate 51 are provided so as to be disposed in the respective movement guiding grooves 211. The two movement guiding grooves 211 form an installation path A that regulates the moving distance and the rotating distance of the coil 8 to be installed on the tooth 71 (see FIG. 7).

As depicted in FIG. 1, FIG. 2, the X direction slide portion 3 is configured using a linear guide 31 including a rail and a slider that slides with respect to the rail. An X direction base 30 is attached to the slider of the linear guide 31.

The Y direction slide portion 4 is configured using a linear guide 42 including a rail and a slider that slides with respect to the rail. The rail of the linear guide 42 is disposed on the X direction base 30. A Y direction base 40 is attached to the slider of the linear guide 42.

The Y direction slide portion 4 is configured to slide parallel to the radial direction R of the stator core 7, that is, the direction in which the teeth 71 are formed, and the X direction slide portion 3 is configured to slide in the direction orthogonal to the Y direction slide portion 4.

The θ direction rotating portion 5 is configured by disposing a θ direction base 50 such that the θ direction base 50 is rotatable via a bearing 55 with respect to a θ direction shaft portion 54 disposed on the Y direction base 40. The θ direction base 50 is formed to extend in the up-down direction H. The coil support portion 6 is disposed in an upper portion of the θ direction base 50.

As depicted in FIG. 3, FIG. 7, the deformation guiding lane 411 in the Y direction slide portion 4 is formed of a deformation guiding groove 411 formed in a deformation guiding plate 41 provided in the Y direction slide portion 4. The deformation guiding member 641 is formed of a deformation guiding roller 641 provided in the deformation link 64 disposed in the θ direction rotating portion 5. The deformation guiding roller 641 in the deformation link 64 is disposed in the deformation guiding groove 411. The deformation guiding groove 441 defines a path that allows regulation of an amount by which the coil 8 to be installed on the tooth 71 is deformed.

As depicted in FIG. 3, the rotating shaft portion 63 is supported so as to extend in the up-down direction H and so as to be rotatable with respect to the θ direction rotating portion 5. A lower end of the rotating shaft portion 63 in the axial direction L is coupled to the deformation link 64. The θ direction rotating portion 5 supports a driven rotating shaft portion 65 that is driven to rotate under rotation of the rotating shaft portion 63 such that the driven rotating shaft portion 65 is rotatable and extends in the up-down direction H. Gears 631, 651 meshing with each other are provided on an upper end side portion of the rotating shaft portion 63 in the axial direction L and a lower end side portion of the driven rotating shaft portion 65 in the axial direction L. Furthermore, as depicted in FIG. 5, FIG. 6, on the θ direction rotating portion 5, a W direction slider 66 is disposed which slides the inner-peripheral-side support portion 62 of the coil support portion 6 in the W direction (W) in the movement plane under rotation of the driven rotating shaft portion 65. The W direction slider 66 is formed of a rack that meshes with a pinion gear 652 provided on the driven rotating shaft portion 65.

When the deformation guiding roller 641 on the deformation link 64 is guided along the deformation guiding groove 411 to rotate the deformation link 64, the rotating shaft portion 63 and the driven rotating shaft portion 65 rotate to slide the W direction slider 66, which causes the inner-peripheral-side support portion 62 to slide relative to the outer-peripheral-side support portion 61 in the W direction (W).

As depicted in FIG. 3, on the θ direction rotating portion 5, a deformation switching portion 67 is disposed which determines in a switching manner whether or not to deform the coil 8 supported by the coil support portion 6. The deformation switching portion 67 can be switched, as depicted in FIG. 3, between a coil deformed position B1 where the rotating shaft portion 63 and the driven rotating shaft portion 65 mesh with each other via the gears 631, 651 and the deformation guiding roller 641 is placed in the deformation guiding groove 411 and a coil non-deformed position B2 where the deformation guiding roller 641 is pulled out from the deformation guiding groove 411 as depicted in FIG. 4.

Figure 4:
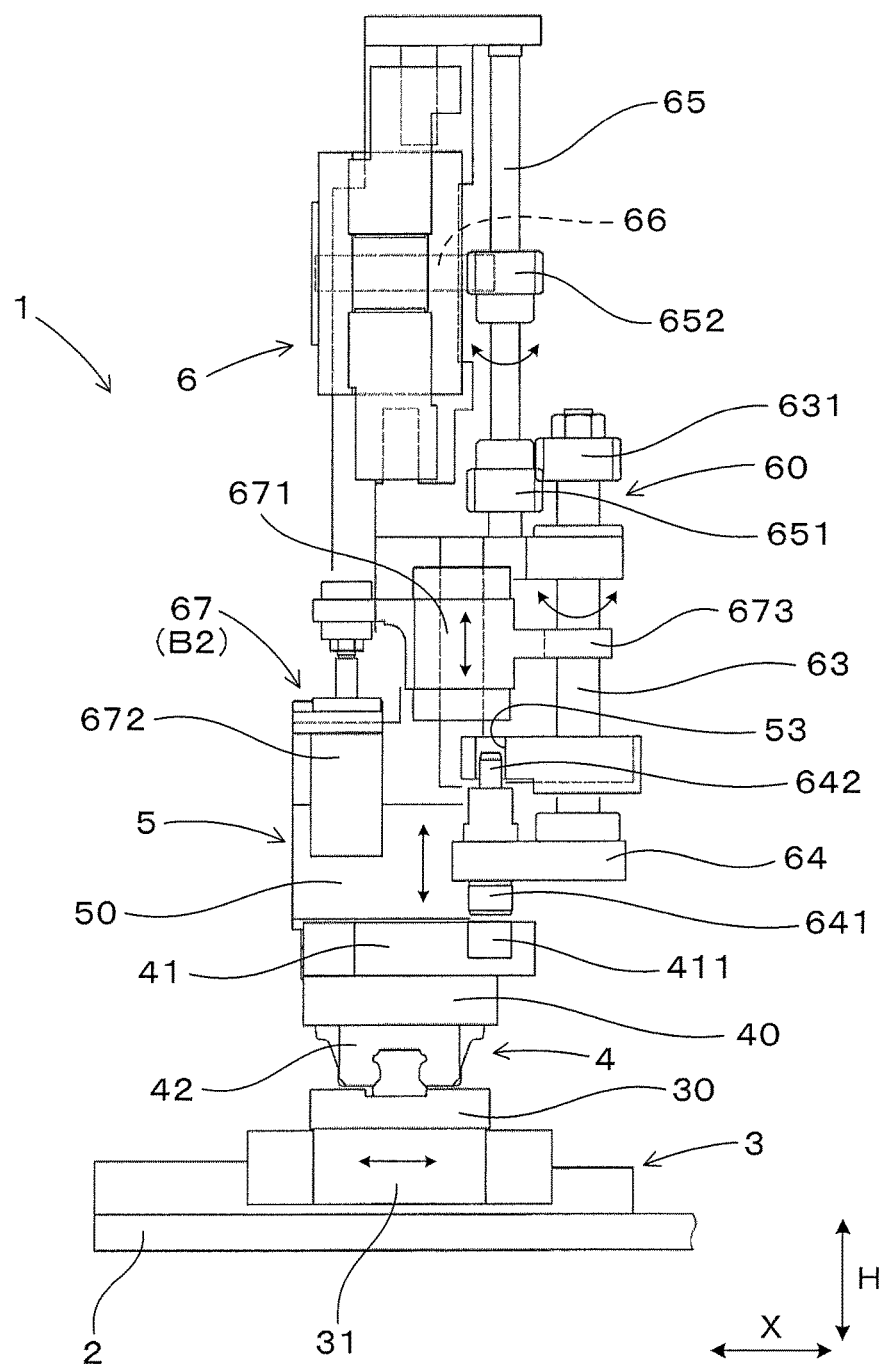
FIG. 4 is a diagram illustrating the coil installation jig with the deformation switching portion located at a coil non-deformed position according to the embodiment as viewed from behind.

As depicted in FIG. 3, FIG. 4, the deformation switching portion 67 has a switching base 671 disposed so as to be slidable in the up-down direction H with respect to the θ direction rotating portion 5 and a switching driving source 672 that slides the switching base 671 in the up-down direction H. The switching base 671 is configured using a linear guide, and the switching driving source 672 is configured using an air cylinder. An extension portion 673 extending from the switching base 671 is attached to the rotating shaft portion 63. When the switching base 671 slides to a side in the up-down direction H (in the present example, upward), the deformation guiding roller 641 in the deformation guiding groove 411 is pulled out to switch the deformation switching portion 67 to the coil non-deformed position B2. Furthermore, when the switching base 671 slides to the other side in the up-down direction H (in the present example, downward), the deformation guiding roller 641 is placed in the deformation guiding groove 411 to switch the deformation switching portion 67 to the coil deformed position B1.

On the deformation link 64, a fixing pin 642 is provided which holds the rotating shaft portion 63 and the driven rotating shaft portion 65 and the W direction slider 66 stationary to prevent rotation of the rotating shaft portion 63 and the driven rotating shaft portion 65 and sliding of the W direction slider 66. The fixing pin 642 can be inserted into and removed from a fixation hole 53 formed in the θ direction base 50 in the θ direction rotating portion 5, by sliding the deformation link 64 in the up-down direction H. Furthermore, the fixing pin 642 is provided at a position above the deformation link 64 such that the fixing pin 642 is on the opposite side of the deformation link 64 from the deformation guiding roller 641 that is provided at a position below the deformation link 64.

As depicted in FIG. 3, when the deformation switching portion 67 is at the coil deformed position B1, the rotating shaft portion 63 and the deformation link 64 slide downward to place the deformation guiding roller 641 in the deformation guiding groove 411, and to pull the fixing pin 642 out from the fixation hole 53. Furthermore, as depicted in FIG. 4, when the deformation switching portion 67 is switched to the coil non-deformed position B2, the rotating shaft portion 63 and the deformation link 64 slide upward to pull the deformation guiding roller 641 out from the deformation guiding groove 411, and to insert the fixing pin 642 into the fixation hole 53. When the fixing pin 642 is inserted into the fixation hole 53, the rotating shaft portion 63, the deformation link 64, and the driven rotating shaft portion 65 are precluded from rotating with respect to the θ direction rotating portion 5, and thus the W direction slider 66 is held stationary to prevent sliding of the W direction slider 66. When the deformation switching portion 67 is at the coil non-deformed position B2, the coil 8 supported by the coil support portion 6 is hindered from being deformed when the θ direction rotating portion 5 rotates with respect to the Y direction slide portion 4.

In the coil installation jig 1 in the present example, the deformation switching portion 67 is placed at the coil deformed position B1 when a final coil 8A to be installed on the tooth 71 of the stator core 7 is installed on the tooth 71. On the other hand, the deformation switching portion 67 is placed at the coil non-deformed position B2 when coils 8B other than the final coil 8A are each installed on the tooth 71. The final coil 8A is the last coil 8 installed on the tooth 71 when the coils 8 are sequentially installed on the plurality of teeth 71 of the stator core 7 such that the installation proceeds all around the stator core 7 in the circumferential direction C, which is either clockwise or counterclockwise. The final coil 8A is likely to interfere with the tooth 71 and the adjacent coils 8 and can thus be appropriately installed on the tooth 71 by being deformed into a rhombus.

Figure 14:
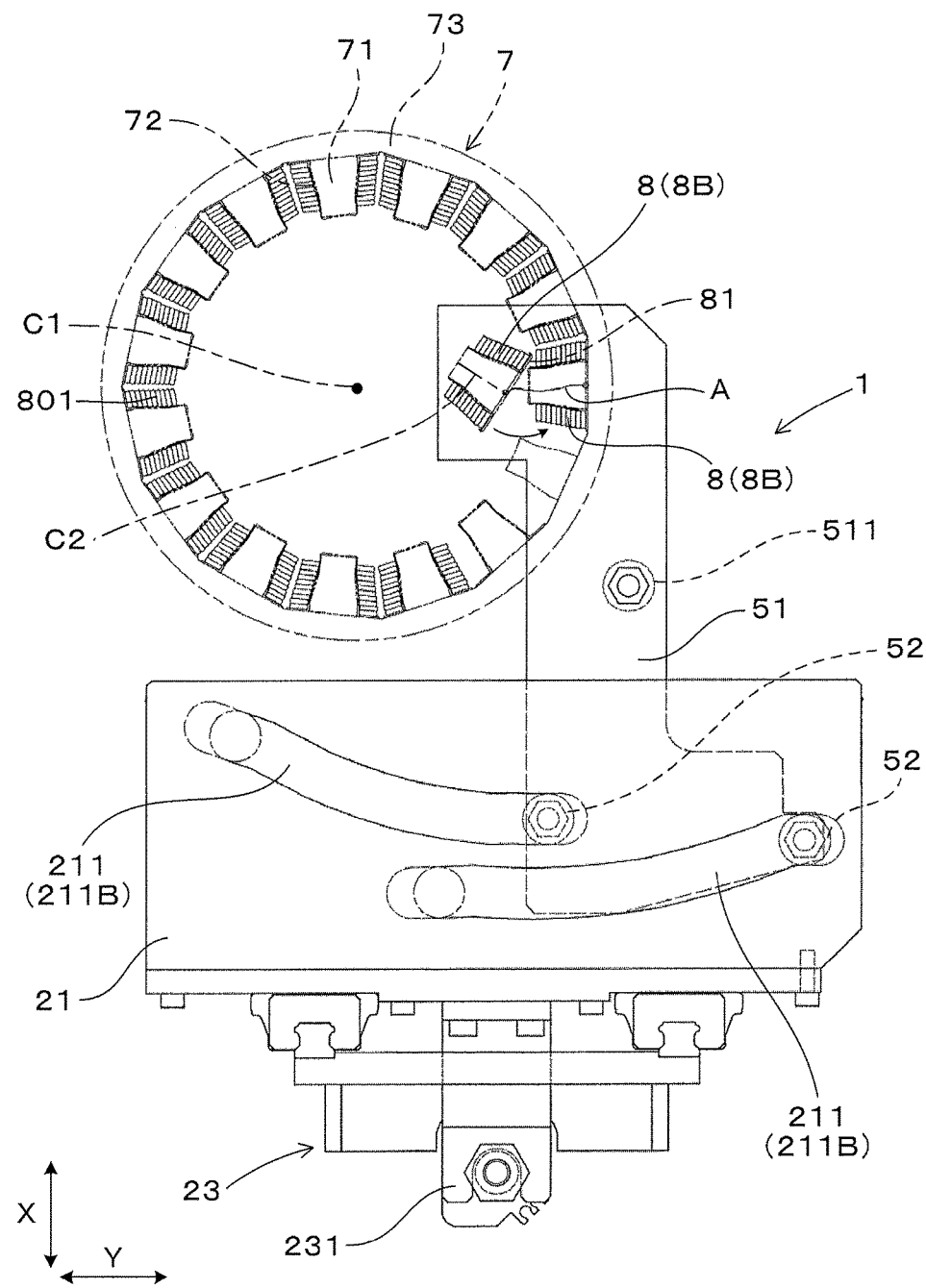
FIG. 14 is a diagram illustrating that the coils other than the final coil are installed on the teeth of the stator core according to the embodiment as viewed from above.

As depicted in FIG. 13, FIG. 14, the coil 8 is formed by winding the rectangular wire 801 into a generally quadrangular shape. The rectangular wire 801 has a generally rectangular sectional shape and is formed by coating an outer periphery of a conductive layer formed of a copper material or the like with a coating layer formed of a resin material or the like. A cross section of the rectangular wire 801 may have a flat shape with flat surfaces parallel to each other. Each coil 8 is a concentrated winding coil installed on the outer periphery of the corresponding tooth 71. The coil 8 is wound into a shape such that a winding width in the circumferential direction C increases toward the outer peripheral side in the radial direction R in accordance with the shape of the tooth 71 with a width in the circumferential direction C increasing toward the outer peripheral side in the radial direction R.

Furthermore, the coil 8 installed on the tooth 71 of the stator core 7 is installed on an outer periphery of an insulator 81 formed of resin that insulates the stator core 7. The final coil 8A is installed on the outer periphery of the insulator 81 pre-installed on the tooth 71 as depicted in FIG. 13. Each of the coils 8B other than the final coil 8A is installed on the tooth 71 after the coil 8B is installed on the outer periphery of the insulator 81 as depicted in FIG. 14.

As depicted in FIG. 1, the movement guiding lane 211 in the present example includes a movement guiding lane 211A used to install the final coil 8A on the tooth 71 (see FIG. 13) and a movement guiding lane 211B used to install the coils 8B other than the final coil 8A on the respective teeth 71 (see FIG. 14). For the movement guiding plate 21 in the base portion 2, an upper movement guiding plate and a lower movement guiding plate are provided. The moving cam plate 51 of the θ direction rotating portion 5 has the movement guiding rollers 52 that are located on an upper surface and a lower surface of the plate 51 and engaged with the movement guiding grooves 211 in the two movement guiding plates 21. Two movement guiding grooves 211 are formed in each movement guiding plate 21. For the movement guiding rollers 52 on the upper surface and the lower surface, two movement guiding rollers are provided on each of the upper and lower surfaces so as to be disposed in the respective movement guiding grooves 211.

The two movement guiding plates 21 can be moved up and down by a lane switching portion 23 disposed on the base portion 2. The lane switching portion 23 is configured to determine, in a switching manner, in which of the movement guiding grooves 211 in the two movement guiding plates 21 the movement guiding rollers 52 on the moving cam plate 51 are placed according to the lane switching portion 23.

As depicted in FIG. 13, FIG. 14, each movement guiding groove 211 is formed into a guide path that allows, before the coil 8 supported by the coil support portion 6 is installed on the tooth 71, the coil 8 to be tilted from a state where the coil 8 lies opposite and perpendicularly to the tooth 71 to a state where the coil 8 is rotated around an axis parallel to the central axial direction C1 of the stator core 7 so as to lie opposite and obliquely to the tooth 71 and that allows the coil 8 to be recovered to the state where the coil 8 lies opposite and perpendicularly to the tooth 71 during or after installation on the tooth 71.

The final coil 8A and the coils 8B other than the final coil 8A are each installed on the tooth 71 such that one side portion of the coil 8 in the circumferential direction C is firstly inserted into the slot 72, and then the other side portion of the coil 8 in the circumferential direction is inserted into another slot 72.

Furthermore, as depicted in FIG. 7, the deformation guiding groove 411 formed in the deformation guiding plate 41 is formed into a path that allows, before the final coil 8A supported by the coil support portion 6 is installed on the tooth 71, the coil 8 to be deformed into a rhombus shape and that allows the final coil 8A to be recovered from the deformation during or after installation on the tooth 71. In a state before the final coil 8A is installed on the tooth 71, where the coil support portion 6 is at the original position 601, the deformation guiding roller 641 is guided along the deformation guiding groove 411 to deform the final coil 8A into a rhombus. Next, the movement guiding rollers 52, guided along the movement guiding grooves 211, move in rotation, and the deformation guiding roller 641 is guided along the deformation guiding groove 411, and thus the final coil 8A recovers from the deformation. Subsequently, the coil support portion 6 moves to the installation position 602 to allow the final coil 8A to be installed on the tooth 71.

In FIG. 7, a trajectory along which an outer-peripheral-side central portion of the final coil 8A passes indicates an installation path for the final coil 8A. Reference character P1 denotes the position of the outer-peripheral-side central portion of the final coil 8A at the time when the coil support portion 6 is at the original position 601. Reference character P2 denotes the position of the outer-peripheral-side central portion of the final coil 8A at the time when the coil support portion 6 is at the installation position 602.

Now, operations and effects of the coil installation method and the coil installation jig 1 in the present example will be described.

When the coil 8 is installed on the tooth 71, the plurality of winding portions 82A, 82B, 82C is sandwiched between the inner-peripheral-side support portion 62 and the outer-peripheral-side support portion 61 in the radial direction R, and the innermost peripheral winding portion 82B of the plurality of winding portions 82A, 82B, 82C arranged at the innermost peripheral side in the radial direction R and the outermost peripheral winding portion 82A of the plurality of winding portions 82A, 82B, 82C arranged at the outermost peripheral side in the radial direction R are restrained in the circumferential direction C, as depicted in FIGS. 8 to 10. This manner of supporting the coil 8 allows formation of a state where the intermediate winding portion 82C corresponding to a portion of the plurality of winding portions 82A, 82B, 82C except the innermost peripheral winding portion 82B and the outermost peripheral winding portion 82A can move freely in the circumferential direction C.

Furthermore, as depicted in FIG. 9, FIG. 10, the coil deforming mechanism 60 moves the innermost peripheral winding portion 82B and the outermost peripheral winding portion 82A relative to each other in opposite directions in the circumferential direction C to deform the coil 8 into a rhombus. When the coil 8 is installed on the tooth 71, even if the intermediate winding portion 82C of the coil 8 interferers slightly with the insulator 81 installed on the tooth 71 or the adjacent coil 8 previously installed on the corresponding tooth 71, the intermediate winding portion 82C can be flexibly displaced.

Additionally, when the coil 8 is installed, an output from an actuator that opens and closes the clampers 611 included in the outer-peripheral-side support portion 61 is reduced to enable weakening of a force that holds the plurality of winding portions 82A, 82B, 82C in a sandwiching manner in the radial direction R. This allows formation of a state where the intermediate winding portion 82C is more easily displaced. At this time, since the innermost peripheral winding portion 82B and the outermost peripheral winding portion 82A are restrained in the circumferential direction C, the whole coil 8 can be prevented from being unnecessarily displaced.

Therefore, the coil installation method and the coil installation jig in the present example allow the coil 8 to be more flexibly and smoothly installed on the tooth 71 of the stator core 7.

Furthermore, in a process of installing the final coil 8A on the tooth 71 of the stator core 7, the coil installation jig 1 in the present example allows the coil support portion 6 to be appropriately moved and rotated and also allows the final coil 8A supported by the coil support portion 6 to be appropriately deformed.

Specifically, when the final coil 8A is installed on the tooth 71, the deformation switching portion 67 is placed at the coil deformed position B1 to allow the lane switching portion 23 to place the movement guiding rollers 52 in the movement guiding grooves 211 for the final coil 8A, as depicted in FIG. 3. As depicted in FIG. 5, the coil support portion 6 is placed at the original position 601 to place the final coil 8A supported by the coil support portion 6 opposite to the tooth 71. At this time, the deformation guiding roller 641 on the deformation link 64 is guided along the deformation guiding groove 411 in the deformation guiding plate 41 to tilt the final coil 8A with respect to the tooth 71. Furthermore, the movement guiding rollers 52 on the moving cam plate 51 are guided along the movement guiding grooves 211 in the movement guiding plate 21 to deform the final coil 8A into a rhombus.

Next, as depicted in FIG. 6, the θ direction rotating portion 5 is driven by the driving source 22 to move the movement guiding rollers 52 provided on the moving cam plate 51 of the θ direction rotating portion 5 along the movement guiding grooves 211 formed in the movement guiding plate 21 of the base portion 2. At this time, the X direction slide portion 3 and the Y direction slide portion 4 slide and the θ direction rotating portion 5 rotates along the guide paths of the movement guiding grooves 211. The coil support portion 6 supporting the final coil 8A moves with the moving distance in the X direction (X) and the Y direction (Y) in the movement plane and the rotating distance in the θ direction regulated. Thus, the moving distance and the rotating distance of the coil support portion 6 can be appropriately set when the final coil 8A is installed on the tooth 71.

Furthermore, as depicted in FIG. 7, when the θ direction rotating portion 5 rotates by a predetermined distance with respect to the Y direction slide portion 4, the deformation guiding roller 641 on the deformation link 64 disposed in the θ direction rotating portion 5 via the rotating shaft portion 63 moves along the deformation guiding groove 411 formed in the deformation guiding plate 41 of the Y direction slide portion 4. When the deformation guiding roller 641 moves along the deformation guiding groove 411, the deformation link 64 and the rotating shaft portion 63 rotate by predetermined distances, and the driven rotating shaft portion 65 rotates by a predetermined distance. Thus, the W direction slider 66 slides in the W direction (W) in the movement plane. This causes sliding of the inner-peripheral-side support portion 62 integrated with the W direction slider 66 and supporting the other end side of the coil 8 in the winding axial direction C2.

At this time, the position of the outer-peripheral-side support portion 61 supporting one end side of the coil 8 in the winding axial direction C2 with respect to the θ direction rotating portion 5 remains unchanged. This causes a change in the position of the other end side of the coil 8 in the winding axial direction C2 relative to the one end side of the coil 8 in the winding axial direction C2, and thus the shape of the final coil 8A deformed into a rhombus gradually recovers to the original shape. Consequently, when the final coil 8A is installed on the tooth 71, the final coil 8A can be appropriately recovered from the deformation to the original state.

Next, the X direction slide portion 3 and the Y direction slide portion 4 slide and the θ direction rotating portion 5 rotates to move the coil support portion 6 to the installation position 602. Furthermore, the support of the final coil 8A by the clampers 611 of the outer-peripheral-side support portion 61 is canceled to remove and transfer the final coil 8A to the tooth 71 of the stator core 7. Subsequently, the driving source 22 is used to drive the X direction slide portion 3, the Y direction slide portion 4, and the θ direction rotating portion 5 to return the coil support portion 6 to the original position 601.

As described above, in the coil installation jig 1, the rotating distance and the deformation amount of the coil 8 can be regulated to appropriately set the installation path A for the coil 8 by sliding the X direction slide portion 3 and the Y direction slide portion 4 and rotating the θ direction rotating portion 5 by the predetermined distances to move the coil support portion 6 in the direction in which the coil 8 is installed on the tooth 71. The installation path A for the coil 8 can be easily set based on the manner of forming the movement guiding lanes 211 and the deformation guiding lane 411.

The invention claimed is:

1. A coil installation method for installing a coil on a tooth of a stator core to manufacture a stator for a rotary electric machine, the coil installation method comprising:

forming the coil such that a rectangular wire is wound into a generally quadrangular shape so as to form three or more winding portions overlapping in a radial direction of the stator core and such that the winding portion positioned on an outer peripheral side in the radial direction has a larger width directed in a circumferential direction of the stator core, and holding the plurality of winding portions in a sandwiching manner in the radial direction, an innermost peripheral winding portion of the plurality of winding portions disposed at an innermost peripheral side in the radial direction and an outermost peripheral winding portion of the plurality of winding portions disposed at an outermost peripheral side in the radial direction are restrained in the circumferential direction, and the innermost peripheral winding portion and the outermost peripheral winding portion are moved relative to each other in opposite directions in the circumferential direction to deform the coil when the coil is installed on the tooth.

2. The coil installation method according to claim 1, wherein four corners of the innermost peripheral winding portion of the generally quadrangular shape are restrained in the circumferential direction of the stator core and an axial direction of the stator core, and at least two corners of the outermost peripheral winding portion of the generally quadrangular shape are restrained in the circumferential direction and the axial direction.

3. The coil installation method according to claim 1, wherein
the coil that has not been installed on the tooth yet is deformed and then recovered from the deformation during or after installation on the tooth.

4. The coil installation method according to claim 2, wherein
the coil that has not been installed on the tooth yet is deformed and then recovered from the deformation during or after installation on the tooth.

5. The coil installation method according to claim 1, wherein
an inner-peripheral-side support is used to support the innermost peripheral winding;
an outer-peripheral-side support is used to support the outermost peripheral winding portion of the plurality of winding portions; and
a coil deformer is used to move the inner-peripheral-side support and the outer-peripheral-side support relative to each other in opposite directions in the circumferential direction,
the inner-peripheral-side support and the outer-peripheral-side support are configured to hold the plurality of winding portions in the radial direction in a sandwiching manner and restrain the innermost peripheral winding portion and the outermost peripheral winding portion in the circumferential direction, and
the coil deformer is configured to move the inner-peripheral-side support and the outer-peripheral-side support relative to each other to deform the coil supported by the inner-peripheral-side support and the outer-peripheral-side support when the coil is installed on the tooth.

6. The coil installation method according to claim 5, wherein
the inner-peripheral-side support is configured to restrain four corners of the innermost peripheral winding portion of the generally quadrangular shape in the circumferential direction of the stator core and an axial direction of the stator core, and
the outer-peripheral-side support is configured to restrain at least two corners of the outermost peripheral winding portion of the generally quadrangular shape in the circumferential direction and the axial direction.

7. The coil installation method according to claim 5, wherein
the coil deformer is configured to move the inner-peripheral-side support and the outer-peripheral-side support relative to each other to deform the coil that has not been installed on the tooth yet and to restore the coil from the deformation during or after installation on the tooth.

8. The coil installation method according to claim 6, wherein
the coil deformer is configured to move the inner-peripheral-side support and the outer-peripheral-side support relative to each other to deform the coil that has not been installed on the tooth yet and to restore the coil from the deformation during or after installation on the tooth.

* * * * *